Figure 1:
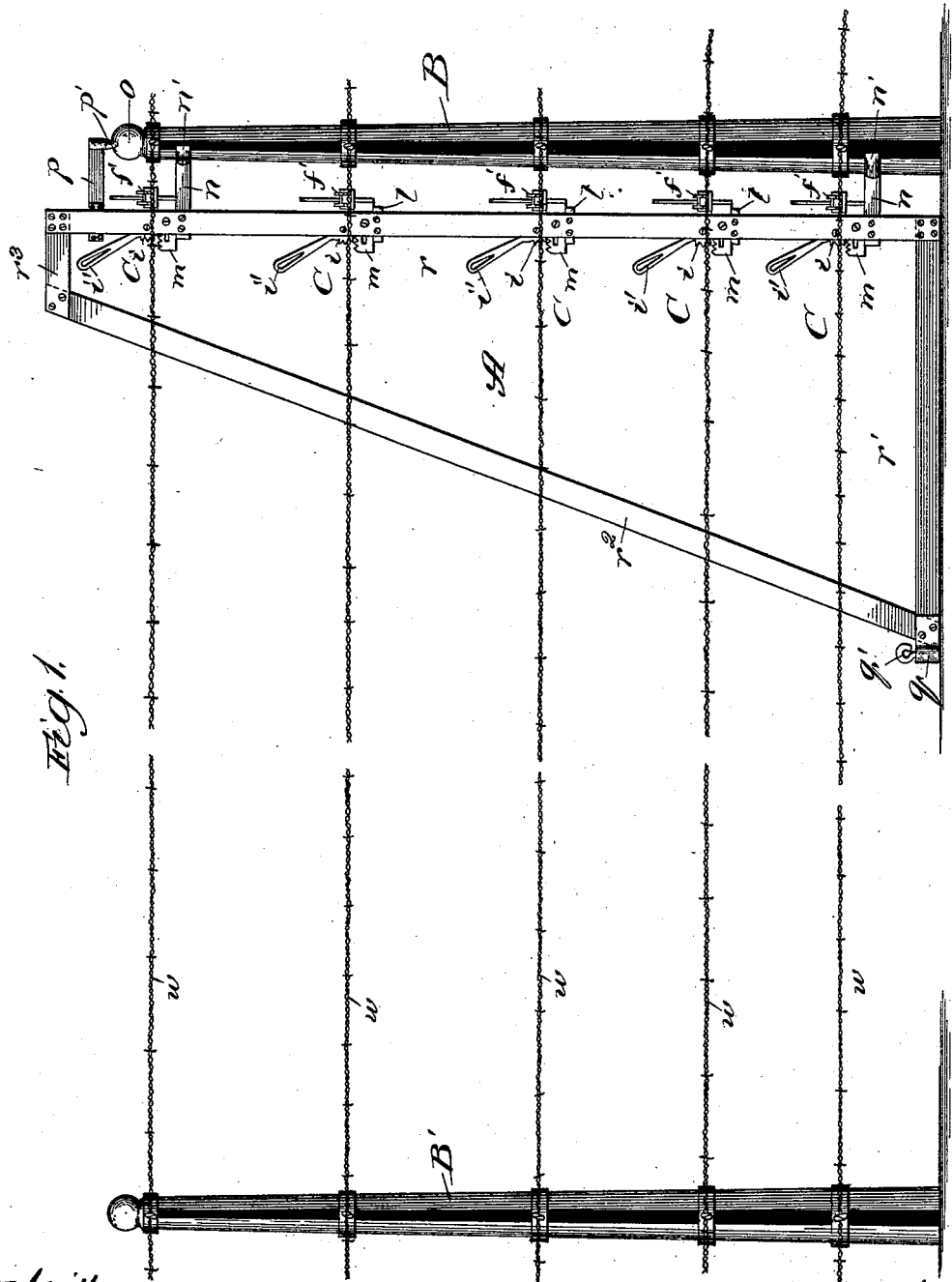

(No Model.) 2 Sheets—Sheet 1.

T. J. THORP.
FENCE WIRE TIGHTENING IMPLEMENT.

No. 464,207. Patented Dec. 1, 1891.

Witnesses:
Chas. E. Gaylord,
Clifford G. White.

Inventor.
Thomas J. Thorp,
By Dyrenforth & Dyrenforth
Attys.

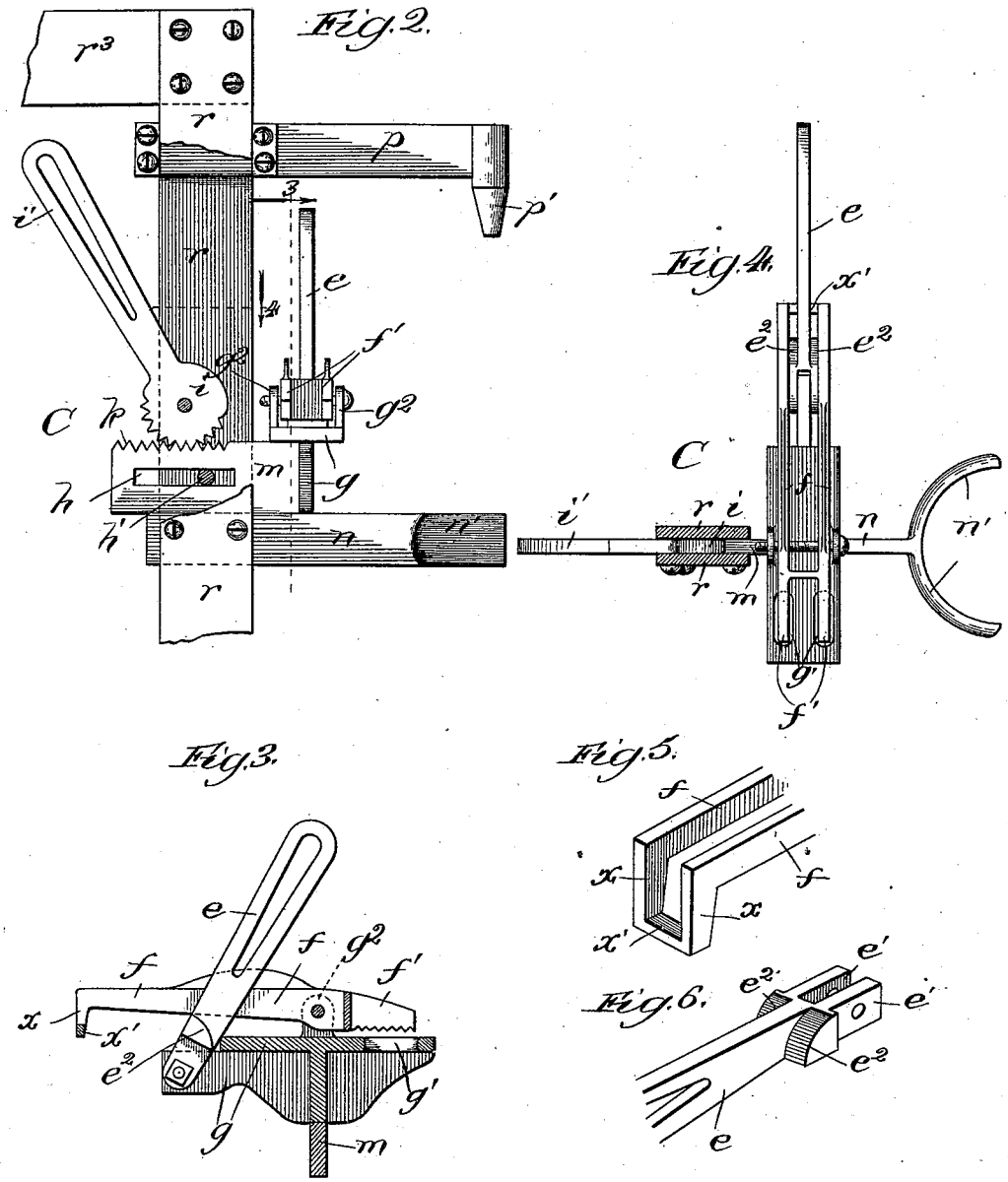

UNITED STATES PATENT OFFICE.

THOMAS J. THORP, OF CHICAGO, ILLINOIS, ASSIGNOR TO THE AMERICAN STEEL POLE AND POST COMPANY, OF SAME PLACE.

FENCE-WIRE-TIGHTENING IMPLEMENT.

SPECIFICATION forming part of Letters Patent No. 464,207, dated December 1, 1891.

Application filed February 25, 1891. Serial No. 382,765. (No model.)

*To all whom it may concern:*

Be it known that I, THOMAS J. THORP, a citizen of the United States, residing at Chicago, in the county of Cook and State of Illinois, have invented a new and useful Improvement in Fence-Wire-Tightening Implements, of which the following is a specification.

The object of my invention is to provide improved means for facilitating the operation of tightening in the sense of pulling taut the wire in the erection of fences formed by stringing separate lengths of wire, plain or barbed, from post to post.

In the accompanying drawings, Figure 1 is a view in the nature of a diagram, representing a wire fence in process of erection with my improved tightening implement for the wires operatively applied. Fig. 2 is a broken view in elevation, enlarged, over the scale observed in Fig. 1, and showing the uppermost of the several similar combined clamping and tightening tools with which my improved implement is provided, as represented in the preceding figure. Figs. 3 and 4 are sectional views taken, respectively, on the lines 3 and 4 of Fig. 2 and viewed as indicated by the arrows. Figs. 5 and 6 are respectively broken views in perspective of details forming co-operating parts of a clamp.

Broadly considered, my improvement comprises a peculiarly-constructed combined wire clamping and tightening tool, of which any desired number (thus one or more) may be provided on a suitable supporting-frame adapted to be adjusted against a post of a wire fence with the clamping portion of each tool in position to receive and hold a wire to be pulled and held taut by the tightening attachment while the wire or wires are being strung to the next adjacent post.

A is a frame, the preferred, though not necessarily the only suitable, form of which is that presented in Fig. 1, of a triangle or substantially a triangle, with its straight side $r$ supported to extend in upright position adjacent to a fence-post B from the side $r'$, forming the base, the oblique side $r^2$ affording a brace between the brace $r'$ and upper end of the side $r$ shown to be connected with the upper end of the brace by a short horizontal bar $r^3$. At the outer end of the base $r$ of the frame A, I provide a vertical eye $q$ to admit a stake $q'$, passed through it into the ground to stay the frame at its lower end, while the frame may be stayed toward its upper end by a stud $p'$, depending from an arm $p$, extending horizontally from near the upper end of the frame, the stud being adapted to be inserted into the top or finial $o$ of the post. If desired, to adapt the device for such manner of fastening to posts of different heights the arm $p$ may be vertically adjustable on the side $r$ of the supporting-frame A. Furthermore, arms $n$ may extend horizontally outward from near the upper and lower ends of the side $r$ of the supporting-frame, being provided at their extremities with concave bearings $n'$ to conform to the post against which they bear the better to brace the frame.

C is a combined wire clamping tool and tightening attachment, and following is the description of the details involved in its construction. A bar $m$ is supported on edge in a suitable guide on the bar $r$, or, as represented, between two parallel strips forming the said bar, to extend and be longitudinally reciprocated transversely thereof. The support shown in Fig. 2 for the bar $m$ there represented is an arm $n$ at its portion embraced between the two parallel strips forming the side $r$ of the frame A. The lowermost of the arms $n$ may serve the same purpose for the bar $m$ of another device C, and each intermediate device C may have its bar $m$ sustained to slide on a suitable guide, such as a support $l$, Fig. 1, secured between the strips of the side $r$ of the supporting-frame. Toward its rear end the bar $m$ is provided on its upper edge with teeth $k$, which render it a rack-bar, the teeth being engaged by a pinion $i$, journaled to that end on the side $r$ and from which extends the handle $i'$. By turning the pinion at its handle in one direction the bar $m$ may be moved longitudinally to protrude beyond the side $r$ of the frame A toward the post B, while by turning the handle in the contrary direction the bar $m$ will be moved in the opposite direction, the extent of its movement being limited by a fixed stud $h'$, passing through a slot $h$, formed in the bar. At the opposite end of the bar $m$ or end opposite that provided with the teeth $k$ it supports rigidly a transversely-extending bed $g$, having toward one end, at opposite sides of its longitudinal center, two openings $g'$, elongated lengthwise of the bed. On the upper side, at opposite edges of the bed $g$, over the bar $m$, are bearings $g^2$, between which is pivotally supported a bifurcated jaw $f$ near its gripping end $f'$, serrated along its under side where the two parallel prongs coincide with the openings $g'$ on the bed $g$. Behind the pivot the two parallel ends forming the handle portion of the jaw $f$ extend some distance beyond the bed $g$, the handle portion being bent downward, as shown at $x$, Fig. 5, toward its rear extremity, where the two parallel bars forming the handle portion are connected by a cross-bar $x'$, as illustrated. A lever $e$ embraces at its bifurcated extremity $e'$ the bed $g$ near its rear end, and is there fulcrumed to the latter and extends thence upward through the handle portion of the jaw $f$. At the base of its bifurcated end $e'$ the lever $e$ is provided with rigid cams $e^2$, to bear, as and for a purpose hereinafter described, against the under edge of the parallel bars forming the handle portion of the jaw $f$. Each of the devices C involves the construction of the one thus described. Hence the foregoing description of the one explains each.

The devices C are secured to the frame A on the bar $r$ thereof at intervals corresponding with those at which the lines of wire $w$ are to be strung from a post B' to the post B; or the devices C may be adjustable on the bar $r$ to adapt the same implement to be used with the wires strung at varying vertical intervals on the posts on different fences.

As represented in Fig. 1, the wires $w$ (shown as barbed) have been fastened at desired vertical intervals on a post B', and have thence been strung upon the next adjacent post B, at which they are being pulled taut and held by my improved implement preparatory to securing them to the post B. Each wire is passed transversely over the slotted end of the bed $g$ of the respective device C and under the gripping end of the jaw $f$. Then by raising the lever $e$ the cams $e^2$ raise the jaw at its handle end and thus clamp its gripping end against the wire, the teeth of the jaw bending or kinking the wire slightly into the openings $g'$ the better to hold it. The handle of the pinion $i$ is then pulled downward, entailing an advance longitudinal movement of the sliding bar $m$, which obviously effects stretching or pulling taut the line of wire from the point to where it is held by the jaw.

When the wires while thus held have been fastened to the post B, they are led to a succeeding post, to which my improved implement may be removed to perform the function described, after separating it from the wires on which it has been caused to operate by turning downward the handles $e$ to release the jaws $f$, when the bars $m$ should also be retracted, thus preparing the implement for the next operation; or, if it be desired to allow the implement to remain in its wire-tightening condition until the tightening of the wires at the next succeeding post has been performed another of the implements may be used for the last-named purpose, thus causing the employment of two for each job.

While I have shown and described the form and construction of my improved devices as they appear to me to be best adapted for the purpose stated, details thereof may be variously modified without thereby entailing departure from the spirit of my invention. Hence I do not wish to be understood as limiting my invention to the exact details set forth.

What I claim as new, and desire to secure by Letters Patent, is—

1. In a fence-wire-tightening implement, a combined wire clamping and stretching tool comprising, in combination, a longitudinally-reciprocable bar supported on the frame of the implement and provided with means for reciprocating it, a jaw pivotally supported on the bar to extend transversely thereof, and a cam-lever fulcrumed on the bar to engage and actuate and release the pivotal jaw, substantially as described.

2. In a fence-wire-tightening implement, the combination, with a suitable frame A, of a desired number of combined wire clamping and stretching tools supported on the frame, and each comprising a longitudinally-reciprocable rack-bar $m$, having an actuating-pinion $i$, a clamp having a pivotal jaw $f$, supported to extend transversely of the rack-bar, and a cam-lever $e$ to actuate the jaw, substantially as set forth.

3. In a fence-wire-tightening implement, the combination, with a suitable frame A, of a desired number of combined wire clamping and stretching tools C, supported on the frame, and each comprising a longitudinally-reciprocable rack-bar $m$, having an actuating-pinion $i$, and a clamp comprising a bed $g$, extending transversely to the rack-bar across its forward end and provided with openings $g'$, a jaw $f$, pivoted to the bed and having teeth at its gripping end, and a cam-lever $e$, supported to engage at its cams the handle end of the jaw, substantially as set forth.

4. A fence-wire-tightening implement comprising, in combination, a frame A, of general triangular form, adapted to be fastened down at its base and provided near its upper end with an arm $p$, carrying a stud $p'$ to engage the upper end of a fence-post and with bracing-arms $n$ $n'$, and a desired number of combined wire clamping and stretching tools C, supported on the bar $r$ of the frame, and each comprising a longitudinally-reciprocable rack-bar $m$, having a limited extent of horizontal movement, an actuating-pinion $i$, engaging the rack-bar, and a clamp comprising a bed $g$, extending transversely to the rack-bar at its forward end and provided with openings $g'$, a jaw $f$, pivoted to the bed and having teeth at its gripping end coinciding with the openings $g'$, and a lever $e$, extending at its handle portion through the rear end of the jaw and provided with cams $e$ on opposite sides to engage the jaw, substantially as set forth.

THOMAS J. THORP.

In presence of—
J. W. DYRENFORTH,
M. J. FROST.